United States Patent
Webster et al.

(10) Patent No.: US 9,309,777 B2
(45) Date of Patent: Apr. 12, 2016

(54) TIP CLEARANCE CONTROL DEVICE

(75) Inventors: John R. Webster, Derby (GB); Nicolas Evanno, Derby (GB); Brian Handley, Derby (GB)

(73) Assignee: ROLLS-ROYCE plc, London (GB)

(*) Notice: Subject to any disclaimer, the term of this patent is extended or adjusted under 35 U.S.C. 154(b) by 743 days.

(21) Appl. No.: 13/547,577

(22) Filed: Jul. 12, 2012

(65) Prior Publication Data

US 2013/0034424 A1 Feb. 7, 2013

(30) Foreign Application Priority Data

Aug. 1, 2011 (GB) .................................. 1113165.3

(51) Int. Cl.
*F01D 11/18* (2006.01)
*F01D 11/20* (2006.01)

(52) U.S. Cl.
CPC ............... *F01D 11/20* (2013.01); *Y02T 50/671* (2013.01)

(58) Field of Classification Search
CPC ... F05D 2300/507; F01D 11/16; F01D 11/18; F01D 11/20; F01D 11/22; F01D 11/24
USPC ....................................................... 415/173.2
See application file for complete search history.

(56) References Cited

U.S. PATENT DOCUMENTS

| | | | |
|---|---|---|---|
| 2,248,798 A | 7/1941 | Wittmann | |
| 2,601,579 A | 6/1952 | Wittmann | |
| 2,678,774 A | 5/1954 | Arvin | |
| 4,242,042 A * | 12/1980 | Schwarz | 415/116 |
| 4,334,822 A * | 6/1982 | Rossmann | 415/113 |
| 4,386,784 A | 6/1983 | Banks | |
| 4,472,108 A | 9/1984 | Pask | |
| 4,804,310 A * | 2/1989 | Fuller et al. | 415/115 |
| 5,211,534 A * | 5/1993 | Catlow | F01D 11/22 415/170.1 |
| 5,456,576 A * | 10/1995 | Lyon | F01D 5/20 415/173.3 |
| 6,220,602 B1 | 4/2001 | Webster et al. | |
| 2006/0042260 A1* | 3/2006 | Webster | F01D 17/085 60/772 |

FOREIGN PATENT DOCUMENTS

| | | |
|---|---|---|
| GB | 1 308 963 | 3/1973 |
| GB | 2 063 374 A | 6/1981 |
| GB | 1 605 255 | 8/1986 |
| GB | 2 253 012 A | 8/1992 |
| GB | 2 336 408 A | 10/1999 |
| GB | 2 363 864 A | 1/2002 |

OTHER PUBLICATIONS

Search Report issued in British Patent Application No. GB1113165.3 dated Oct. 24, 2011.

* cited by examiner

*Primary Examiner* — Richard Edgar
(74) *Attorney, Agent, or Firm* — Oliff PLC

(57) ABSTRACT

A tip clearance control device adapted to control the clearance of a rotating aerofoil structure with a surrounding casing portion, and a method of controlling the tip clearance of a rotating aerofoil structure with a surrounding casing portion. The device includes a member operatively connected to the casing portion; the member having at least a first configuration in which the casing portion is at a first radial position and a second configuration in which the casing portion is at a second radial position, wherein the configuration of the member is controlled by magnetic flux in a magnetic circuit which includes at least one ferromagnetic element including ferromagnetic material, where the configuration of the member is responsive to the temperature of the ferromagnetic element.

14 Claims, 5 Drawing Sheets

TIP CLEARANCE CONTROL DEVICE

The present disclosure relates to a blade tip clearance control apparatus for use with a gas turbine engine. In particular, the present disclosure is concerned with providing a clearance control apparatus for a gas turbine engine to control the clearance between a casing or static portion of the engine and the tips of turbine blades.

BACKGROUND

It is important to keep the clearance between the tips of rotating blades and a static portion, such as the radially inner surface of an annular shroud, which surrounds the blade tips to a minimum. The clearance is controlled to minimise the leakage of turbine gases between the shroud and the blade tips. Minimising the leakage of the turbine gases improves the engine efficiency and thereby reduces the specific fuel consumption of the engine.

During the conventional operating cycle of a gas turbine engine the turbine blades, and the discs on which they are mounted, expand due to centrifugal forces acting on them as they rotate at high speeds and by thermal expansion due to being heated by the working fluid passing therethrough. The annular shroud however is stationary and only expands due to being heated by the working fluid. Differential expansion occurs and the clearance between the blade tips and the shroud has to be controlled to give a minimum clearance at steady state conditions whilst ensuring that the blade tips do not rub on the shroud during transients.

To this end, various control systems have been proposed. By way of example, GB2253012 discloses a blade tip clearance control apparatus which, as shown in FIG. 1, comprises a pressure tube 2 provided behind an arc shaped shroud segment 4. The pressure tube 2 is pressurised by a source of pressurised air to inflate the pressure tube 2 and thus move the shroud segment 4 closer to the tips of the blades 6.

The pressurisation is managed by a switch which is in turn controlled by a control of the engine. Similarly, U.S. Pat. No. 4,472,108 and GB1605255 also disclose pressure activated tip clearance control systems.

However, there are some instances where a gas turbine engine will be working to a higher than normal capacity (for example, during take-off of an aeroplane if the engine is an aero engine) and the blades will expand more due to the increased rotational speeds and/or temperatures encountered during such instances. Consequently, it is desirable to provide a tip clearance control system which can account for such instances. Furthermore, for the sake of reliability and ease of manufacture, it is desirable to have a tip clearance control system that manages the tip clearance independent of an engine control system.

The present disclosure therefore seeks to address these issues.

STATEMENTS OF INVENTION

According to a first aspect of the present invention there is provided a tip clearance control device adapted to control the clearance of a rotating aerofoil structure with a surrounding casing portion, the device comprising: a member operatively connected to the casing portion; the member having at least a first configuration in which the casing portion is at a first radial position and a second configuration in which the casing portion is at a second radial position, wherein the configuration of the member is controlled by magnetic flux in a magnetic circuit which includes at least one ferromagnetic element comprising ferromagnetic material, whereby the configuration of the member is responsive to the temperature of the ferromagnetic element.

The device may further comprise an aerofoil structure tip clearance control system adapted to control the radial position of the casing portion. The device may further comprise a conduit coupled to a fluid supply. The conduit may be arranged to selectively provide fluid to the aerofoil structure tip clearance control system to move the casing portion between the first and second radial positions. The member may be disposed to restrict flow through the conduit in the first configuration and permit flow through the conduit in the second configuration. Accordingly, the member may form part of a magnetic valve. The member may form part of a valve and may be disposed to selectively block a passage through the valve.

The aerofoil structure tip clearance control system may comprise an expandable chamber configured to move the casing portion from the first radial position to the second radial position upon expansion of the chamber. The conduit may be arranged to selectively provide fluid from the fluid supply to expand the expandable chamber. Similarly, when fluid is not provided to the expandable chamber, the expandable chamber may contract and the casing portion may move from the second radial position to the first radial position.

The aerofoil structure tip clearance control system may be configured to move the casing portion from the first radial position to the second radial position by cooling the casing portion with the fluid so as to shrink the casing portion. Similarly, the aerofoil structure tip clearance control system may be configured to move the casing portion from the second radial position to the first radial position by allowing the casing portion to warm up so as to expand the casing portion.

The device may be further configured to selectively cool a component. For example, the device may be configured to permit flow from the fluid supply to the component when the member is the first configuration such that the component is cooled by the fluid. The component may not be cooled by the fluid when the member is in the second configuration, e.g. the magnetic valve may be configured to restrict flow from the fluid supply to the component when the member is the second configuration. The component may be one or more of: a turbine blade tip seal, a turbine blade or a nozzle guide vane.

The magnetic element may be thermally coupled to the fluid. The ferromagnetic element may be thermally coupled to the casing portion. The ferromagnetic element may be thermally coupled to the aerofoil structure.

The device may further comprise a sensor passage in communication with the expandable chamber, the sensor passage is arranged to sense radial growth of the rotating aerofoil structure and to relieve pressure in the expandable chamber to move the casing portion from the second radial position to the first radial position.

A control orifice may be provided in the conduit coupled to the fluid supply.

The rotating aerofoil structure may comprise a disc and a plurality of rotor blades, the rotor blades having platforms and the sensor passage is arranged to sense radial growth of the platforms of the rotor blades.

The device may further comprise a stationary structure, the sensor passage passes through the stationary structure, the platforms of the rotor blades have radially inner surfaces and the sensor passage is spaced from the radially inner surfaces of the platforms of the rotor blades.

A gas turbine engine, e.g. a jet engine, may comprise the aforementioned device. The member may be located in a non-rotating part of the gas turbine engine. The magnetic circuit may include at least a part located in a rotating part of the gas turbine engine. The fluid supply may be a compressor of the gas turbine engine, eg a bleed port in the compressor, the compressor exhaust or any other part of the compressor. The fluid supplied by the fluid supply may be air.

According to a second aspect of the present invention there is provided a method of controlling the tip clearance of a rotating aerofoil structure with a surrounding casing portion; the method comprising: providing a member operatively connected to the casing portion; moving the member from a first configuration in which the casing portion is at a first radial position to a second configuration in which the casing portion is at a second radial position; and controlling the configuration of the member by a magnetic flux in a magnetic circuit which includes at least one ferromagnetic element comprising ferromagnetic material, whereby the configuration is responsive to the temperature of the ferromagnetic element.

The method may further comprise providing an aerofoil structure tip clearance control system adapted to control the radial position of the casing portion. Fluid may be selectively provided to the aerofoil structure tip clearance control system, e.g. through a conduit coupled to a fluid supply. The fluid may move the casing portion between the first and second radial positions. The method may further comprise restricting flow through the conduit when the member may be in the first configuration; and permitting flow through the conduit when the member may be in the second configuration.

The aerofoil structure tip clearance control system may be provided with an expandable chamber. The conduit may be arranged to selectively provide fluid from the fluid supply to the expandable chamber. Expanding the chamber with fluid from the fluid supply may move the casing portion from the first radial position to the second radial position. Similarly, the expandable chamber may contract and the casing portion may move from the second radial position to the first radial position when fluid is not provided to the expandable chamber.

The method may further comprise moving the casing portion from the first radial position to the second radial position by cooling the casing portion with the fluid to shrink the casing portion. The method may also comprise moving the casing portion from the second radial position to the first radial position by allowing the casing portion to warm up so as to expand the casing portion.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 2:
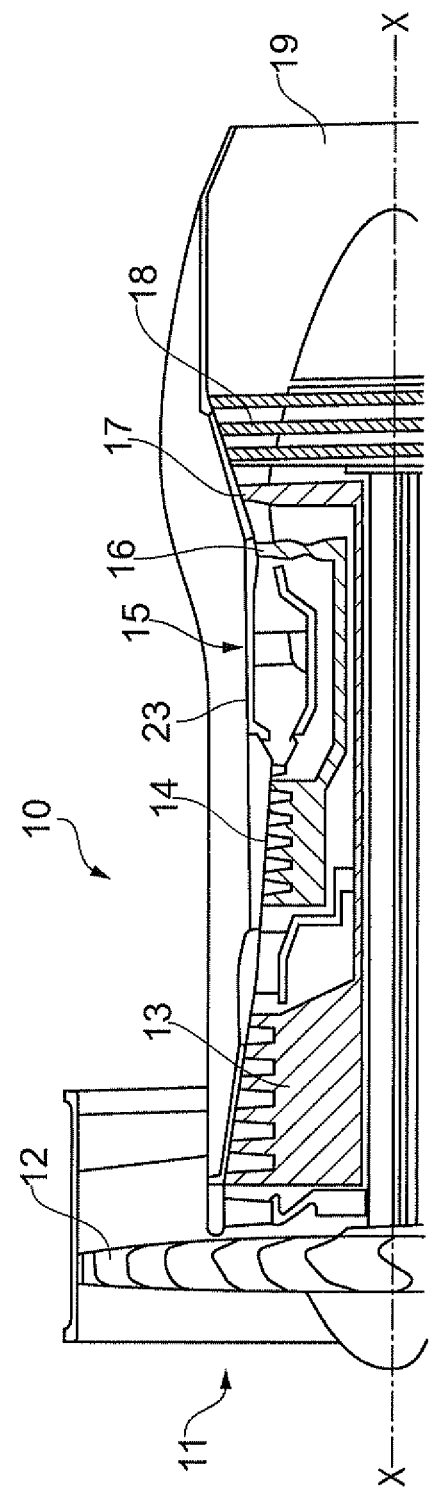
FIG. 2 illustrates a sectional side view of the upper half of a gas turbine engine.

The embodiments to be described relate to a gas turbine engine of the type illustrated in FIG. 2. The gas turbine engine of FIG. 2 is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17, a low pressure turbine 18 and an exhaust nozzle 19.

The gas turbine engine 10 operates in a conventional manner so that air entering the intake 11 is accelerated by the fan 12 which produces two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high, and intermediate pressure compressors 14 and 13 and the fan 12 by suitable interconnecting shafts.

High temperatures arise within the gas turbine engine during operation and various components therefore expand. This is particularly true for aerofoil structures, e.g. blades, within the high pressure turbine 16 where the temperatures are highest. Furthermore, since the turbine rotor blades are subjected to a centrifugal force due to their rotation and the stationary casing surrounding the high pressure turbine blades is not subjected to such centrifugal forces, the clearance between the turbine blades and the casing is reduced. This effect is accentuated when the gas turbine engine is operating in excess of normal operating conditions since the temperatures and centrifugal forces encountered are higher. The embodiments described below relate particularly, but not exclusively, to the control of the clearance between the blade tips and the casing.

Figure 3A:
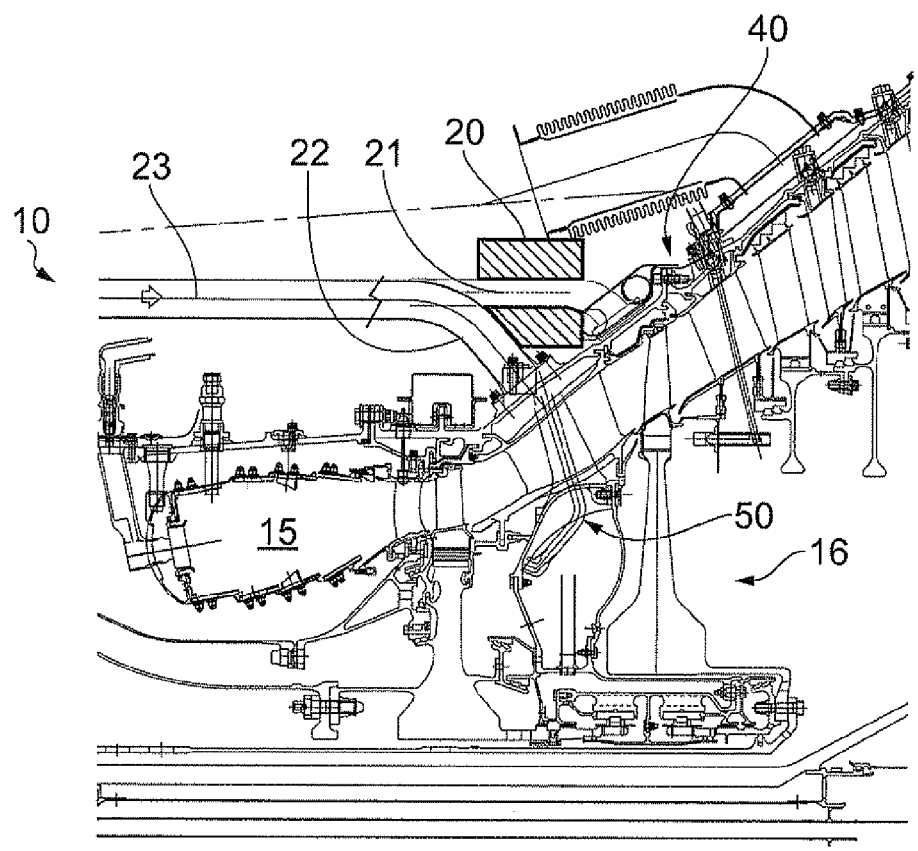
FIG. 3A illustrates a tip clearance control device within a gas turbine engine according to an example of the present invention.

Referring to FIG. 3A a gas turbine engine 10 (partially shown) may comprise a device 20 for controlling flow of fluid to a tip clearance control system 40. The device 20 may also control the flow of fluid to a cooling system 50. The device 20 may selectively direct flow to the tip clearance control system 40 or the cooling system 50, although a portion of the flow may flow to the cooling system 50 at all times. Fluid may be provided to the device from a fluid supply, e.g. compressors 13, 14, via a conduit 23. The device may then selectively provide fluid to the tip clearance control system 40 or the cooling system 50 via first and second conduits 21, 22 respectively. In the particular example shown, the device 20 comprises a magno-valve which selectively directs flow to the tip clearance control system 40 depending on a temperature within the gas turbine engine 10.

Figure 1:
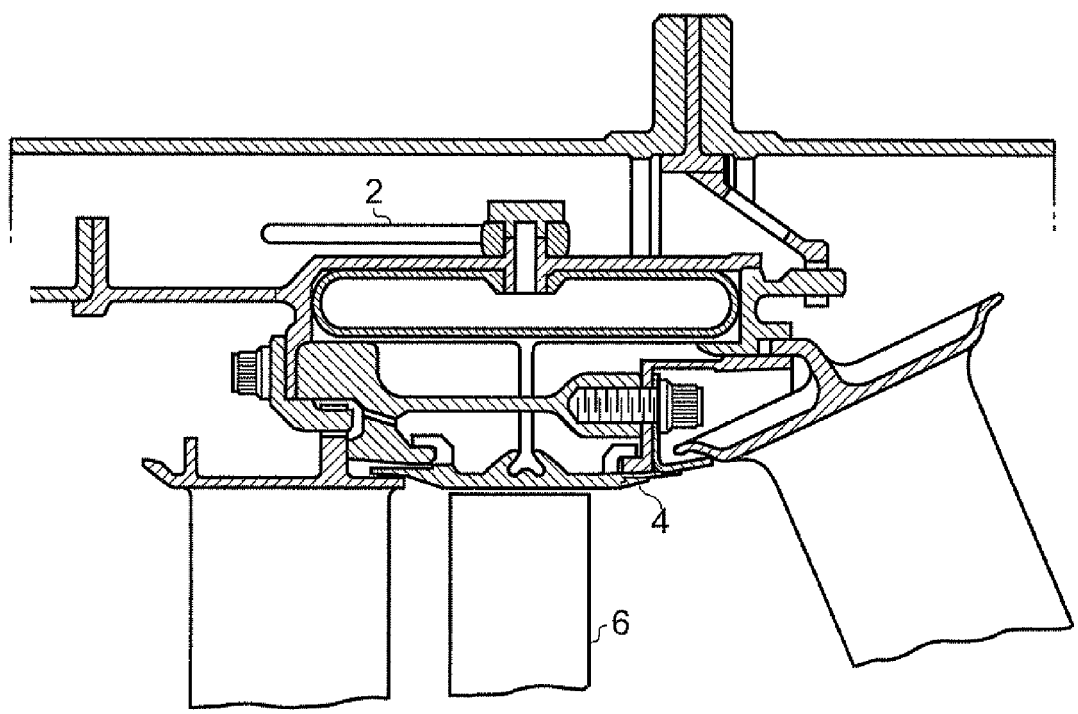
FIG. 1 shows a previously-proposed tip clearance control apparatus.
Figure 3B:
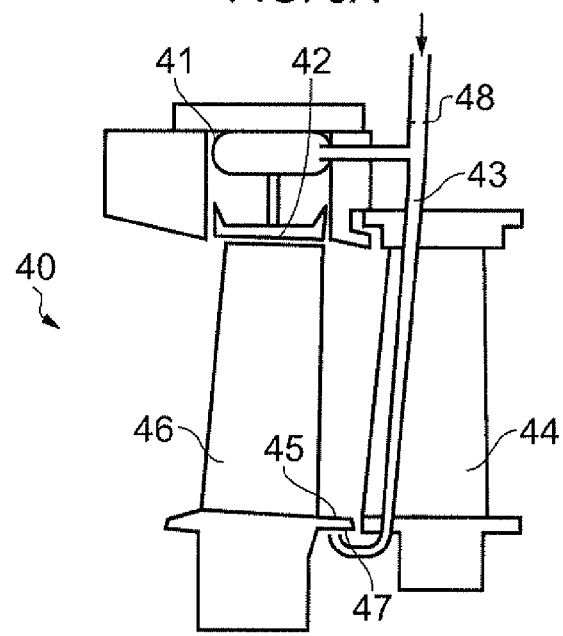
FIG. 3B illustrates an example of an aerofoil structure tip clearance control system according to an example of the present invention.

An example of a tip clearance control system 40 is shown in FIG. 3B, although it may also be similar to the tip clearance control system shown in FIG. 1. As shown, the tip clearance control system 40 may comprise a selectively expandable chamber 41, which in turn moves a casing portion 42 from a first, e.g. outer, radial position to a second, e.g. inner, radial position. Thus, by communicating pressurised fluid to the tip clearance control system 40 the casing portion 42 may be in the second inner position and conversely by blocking the pressurised fluid from the tip clearance control system 40 the casing portion 42 may be in the first outer position.

As depicted in FIG. 3B, the tip clearance control system 40 may further comprise a sensor passage 43, which may be in fluidic communication with the expandable chamber 41 and may pass through a stationary structure, eg a stator vane, turbine vane, 44. The sensor passage 43 may be positioned to sense radial growth of a platform 45 of the rotor blade, turbine rotor blade, 46 or a disc surface. To limit the flow a control orifice 48 may also be provided in the flow passage from the air supply to the tip clearance control system 40. The sensor passage 43 may end adjacent to the platform 45 of the rotor blade 46 such that when the rotor blade 46 has expanded under high capacity operation, a gap 47 is present between the end of sensor passage 43 and the platform 45 of the rotor blade 46. In particular the end of the sensor passage 43 is spaced radially inwardly from the radially inner surfaces of the platforms 45 of the rotor blades 46. Conversely, the sensor passage 43 may be arranged such that when the rotor blade 46 is under normal operation and has not expanded as much as under high capacity operation, a smaller or no gap is present between the end of sensor passage 43 and the platform 45 of the rotor blade 46. Thus, when the rotor blade 46 is operating under high capacity conditions, the gap 47 is present and pressure is relieved from the expandable chamber 41 such that the casing portion 42 moves radially outwards, thereby avoiding any rubbing with the tip of the rotor blade 46. However, under normal operating conditions, the rotor blade 46 contracts and the gap 47 is reduced in size such that the pressure relief is reduced and the pressure may build up within the expandable chamber 41. The casing portion 42 may then move radially inwardly, thus ensuring that the tip clearance is minimised under normal operating conditions. The pressure applied to the expandable chamber 41 is then determined by the gap, inlet air pressure and the control orifice 48. However, by providing the magno-valve to selectively permit flow to the tip clearance control system 40, e.g. only during normal operation, excessive leakage of air through the gap 47 can otherwise be avoided, e.g. during high capacity operating conditions.

FIGS. 4 and 5 illustrate examples of the device 20 for controlling flow of fluid to a tip clearance control system 40. The device 20 comprises: a first conduit 21, coupled to a supply of fluid, for providing fluid to the tip clearance control system 40, eg for the turbine arrangement of the gas turbine engine 10. The device may further comprise a second conduit 22, also coupled to the supply of fluid, for providing fluid to components of the turbine arrangement to be cooled. A magnetic valve 26 for at least partially restricting the flow to conduits 21 and 22 may be provided. The magnetic valve 26 may have a valve member 28 with at least a first configuration in which the second conduit 22 is at least partially restricted and the first conduit 21 is in fluidic communication with the fluid supply. The valve member 28 may have a second configuration in which the second conduit 22 is relatively open to the fluid supply and the first conduit 21 is at least partially restricted. The configuration of the valve member 28 may be controlled by magnetic flux in a magnetic circuit which includes at least one member comprising ferromagnetic material, whereby the configuration is responsive to the temperature of the member comprising ferromagnetic material.

Figure 4A:
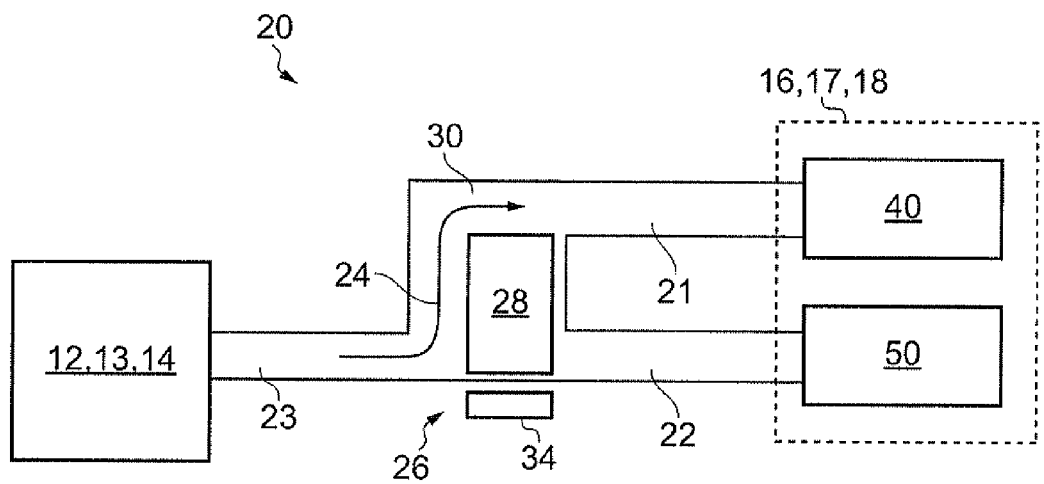
FIG. 4A illustrates a schematic diagram of one embodiment of the present invention operating in a first configuration.
Figure 4B:
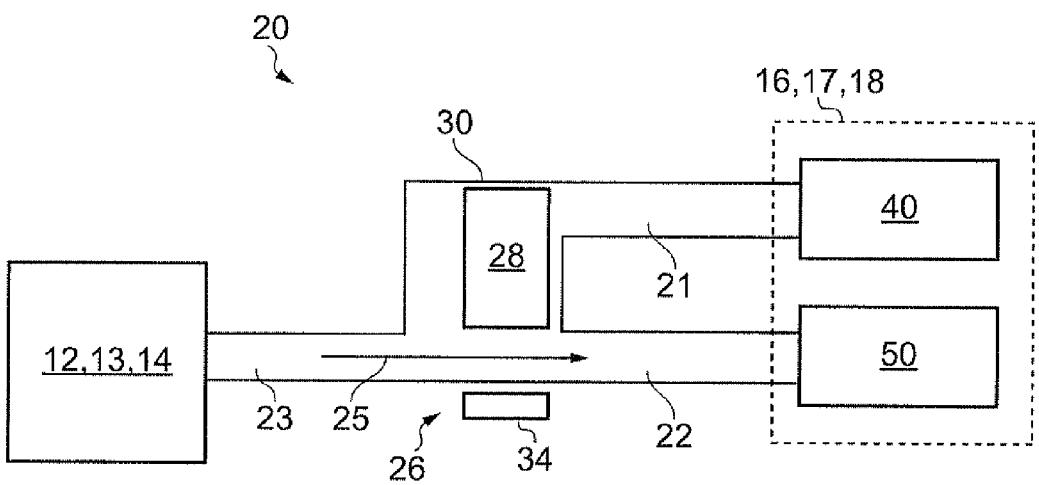
FIG. 4B illustrates a schematic diagram of the embodiment illustrated in FIG. 4A operating in a second configuration.

FIGS. 4A and 4B illustrate a schematic diagram of one embodiment of the present invention. With reference to FIG. 4A, the tip clearance control system 40 (for example, for the turbine arrangement 16, 17, 18) is coupled to a supply of fluid (for example, the compressor 12, 13, 14) via the first conduit 21 and the cooling system 50 is coupled to the supply of fluid via the second conduit 22. The first and second conduits 21, 22 are in this example, pipes for transporting fluid. For example, fluid may be supplied to the tip clearance control system 40 or the cooling system 50 of the turbine, from the compressor, through the first and second conduits 21, 22 respectively. The direction of the flow of fluid in each case is indicated generally by arrows 24, 25 respectively. A magnetic valve 26 is provided to determine whether the fluid flows to the tip clearance control system 40 or the cooling system 50. The fluid is, in this example, air.

The magnetic valve 26 comprises a valve member 28 which has at least two configurations. FIG. 4A illustrates the first configuration of the valve member 28 whereby the valve member 28 permits flow from the compressor 12, 13, 14, through the first conduit 21 and to the tip clearance control system 40. By contrast, flow to the second conduit 22 and thus cooling system 50 is restricted by the valve member 28 when in the first configuration. However, the valve member 28 may be arranged not to completely restrict the flow of fluid. Consequently, some fluid may continue to pass the valve member 28, through the second conduit 22 and to the cooling system 50 (e.g. to cool components which require cooling even during normal operation). FIG. 4B illustrates a second configuration in which the valve member 28 is in a recess 30 and consequently, the second conduit 22 is relatively or fully open to the fluid supply. However, in the second configuration, the first conduit 21 is blocked from the fluid supply by the valve member 28 such that the fluid supply is not in fluidic communication with the tip clearance control system 40.

A permanent magnet 34 is located outside the first and second conduits 21, 22, generally opposite the recess 30, for reasons which will become apparent.

The two configurations represent two operating states of a gas turbine engine. FIG. 4A represents the gas turbine engine working under normal operating conditions in which the cooling system 50 does not require the fluid (or extra fluid) for cooling. Similarly, in the normal operating state the tip clearance control system 40 requires pressurised fluid to move the casing portion 42 to a radially inner position in order to minimise the tip clearance and thus any losses. By contrast, FIG. 4B represents the gas turbine engine when it is operating at a higher than normal capacity and is therefore at a relatively high temperature. In this operating configuration, it is necessary to cool components of the turbine arrangement 16, 17, 18 using the fluid. Since the valve member 28 is in the recess 30, the conduit 22 is relatively open and allows fluid to be provided to the components to be cooled. Equally, in the high capacity configuration, pressurised fluid from the fluid supply is no longer in fluidic communication with the tip clearance control system 40 and the casing portion 42 moves radially outwards thereby accommodating any expansion in the turbine blades 46 and avoiding any rubbing with the casing portion 42.

In the second configuration shown in FIG. 4B the fluid may be used to cool any part of the turbine arrangement 16, 17, 18, for example the intermediate pressure (IP) turbine blade tip seals, turbine blades 46, turbine vanes 44 or nozzle guide vanes. The amount of air used to cool down such parts of the engine may be regulated as a function of the engine condition:

at take off the cooling air is at its maximum, whereas once the aircraft is in cruise this cooling air can be reduced to improve specific fuel consumption by improving the engine efficiency. High pressure (HP) turbine blade tip seals, turbine blades 46, turbine vanes 44 or nozzle guide vanes may require at least a portion of the fluid in all operating states. This may be provided by an alternative, unmodulated arrangement (not shown) or by ensuring that adequate flow through the valve 26 is possible even in the restricted condition of FIG. 4A.

The valve member 28 comprises ferromagnetic material having a Curie point. The Curie point is the temperature at which a magnetic material significantly loses its magnetic properties. In the first configuration illustrated by FIG. 4A, the temperature of the fluid from the fluid supply is below the Curie point of the valve member 28 (since the gas turbine engine is not working in the high capacity mode). Consequently, the valve member 28 retains its magnetic properties. A magnetic circuit exists from the permanent magnet, across the conduit 22 and through the valve member 28, and results in sufficient flux to attract the valve member 28 across the conduit 22, toward the permanent magnet 34, thereby restricting the conduit 22. The conduit 22 may not be fully closed, as has been described, so that some fluid still flows to the cooling system 50.

In FIG. 4B, the temperature of the fluid is greater than the Curie point of the valve member 28 (since the gas turbine engine is now working in the high capacity mode and the temperatures are raised) and therefore the valve member 28 loses its magnetic properties. Consequently, the magnetic flux collapses in the circuit through the permanent magnet 34 and the valve member 28 such that the valve member 28 is no longer attracted to the permanent magnet 34. A spring (not illustrated) may be provided for moving the valve member 28 into the recess 30, when the attraction to the magnet 34 is removed.

Consequently, an advantage provided by embodiments of the present invention is that when the temperature of the fluid is greater than the Curie point of the valve member 28, pressurised fluid is not provided to the tip clearance control system 40 so that the casing portion 42 moves radially outwards and cooling fluid is provided to components of the turbine arrangement 16, 17, 18. Thus, control of the tip clearances and cooling of the components within the turbine arrangement 16, 17, 18 is self modulating.

Figure 5A:
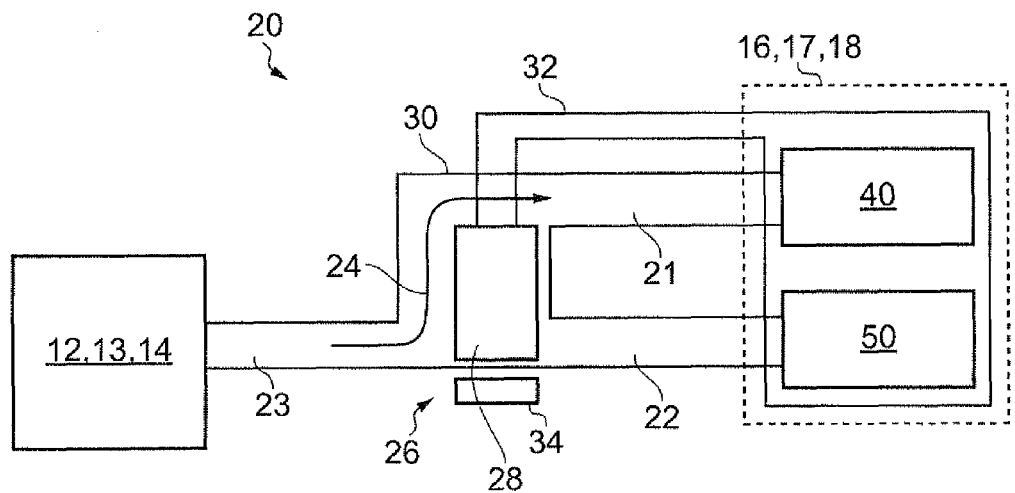
FIG. 5A illustrates a schematic diagram of a second embodiment of the present invention operating in a first configuration.
Figure 5B:
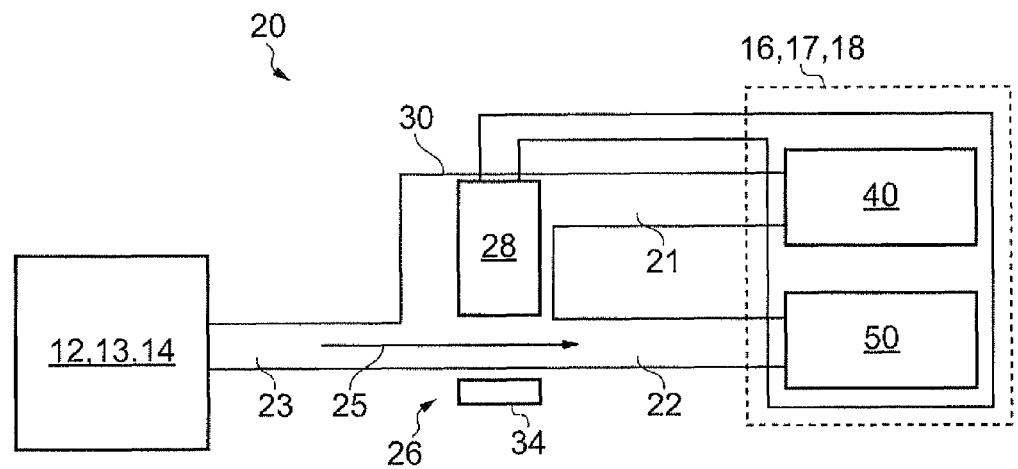
FIG. 5B illustrates a schematic diagram of the second embodiment illustrated in FIG. 5A operating in a second configuration.

FIGS. 5A and 5B are schematic diagrams of a second embodiment of the present invention. FIGS. 5A and 5B are similar to FIGS. 4A and 4B and where the features are the same, the same reference numerals have been used. In this embodiment, the magnetic valve 26 is thermally coupled, via thermal circuit 32, to a component of the gas turbine engine (for example, a casing portion or aerofoil structure of the turbine arrangement 16, 17, 18). The thermal circuit 32 may include at least some ferromagnetic material, eg in the valve member 28. The thermal coupling of the ferromagnetic material to the turbine arrangement 16, 17, 18 makes the configuration of the valve member 28 substantially dependent on the temperature of the turbine arrangement 16, 17, 18, as follows.

In the first configuration, illustrated by FIG. 5A, the temperature of the component of the gas turbine engine 10 is less than the Curie point of the valve member 28.

Consequently, the ferromagnetic material in the valve member 28 retains its magnetic properties. A magnetic circuit from the permanent magnet 34, across the conduit 22 and through the valve member 28 results in sufficient flux to attract the valve member 28 across the first conduit 22, towards the magnet 34, thereby restricting the first conduit 22.

In the second configuration, illustrated by FIG. 5B, the temperature of the turbine arrangement 16, 17, 18 is greater than the Curie point of the ferromagnetic material in the valve member 28. Consequently, the magnetic flux collapses in the circuit through the permanent magnet 34 and the valve member 28, such that the valve member 28 is no longer attracted to the permanent magnet 34. A spring (not illustrated) may be provided for moving the valve member 28 into the recess 30, when the attraction to the magnet 34 is removed.

In an alternative arrangement, the circuit 32 shown in FIG. 5 may be a magnetic circuit and in a manner similar to that disclosed in US2006/0042260 (which is enclosed herein by reference) at least part of the magnetic circuit may be within a rotating part of the turbine arrangement 16, 17, 18. FIG. 3D and the associated description within US200610042260 disclose such an arrangement and the details are incorporated herein by reference.

An advantage provided by the second embodiment (and its alternative), is that the temperature of components within the turbine arrangement 16, 17, 18 directly influences the configuration of the valve member 28. Furthermore, the magnetic valve 26 may be located remote from the turbine arrangement 16, 17, 18 of the gas turbine engine 10 because the magnetic and thermal circuits may cross boundaries (for example, non-ferromagnetic vessel walls) or gaps. This is advantageous if the component (for example, a turbine blade) rotates because the magnetic valve 26 may not operate when under a high centrifugal force and can be placed in a non-rotating part of the gas turbine engine.

Although the present disclosure has described a tip clearance control system which is also coupled to a cooling system, the cooling system may be omitted such that the magno-valve may selectively permit flow to the tip clearance control system only. In other words, conduit 22 and the cooling system 50 may be omitted from the tip clearance control device. Nevertheless, the gas turbine engine 10 may comprise a separate magno-valve for controlling flow to the cooling system 50. Such an arrangement would allow the magno-valves to have different threshold temperatures (ie Curie points) at which the cooling and tip clearance systems are activated or deactivated respectively.

Furthermore, although the present disclosure has described a blade tip clearance system for a turbine blade, the present disclosure may equally control tip clearances within a compressor, e.g. for a fan blade or any other aerofoil structure within a gas turbine engine.

In an alternative embodiment (not shown), the tip clearance control system may differ from that shown in FIG. 3B. For example, the tip clearance control system may comprise a casing portion which may be shrunk by cooler air selectively provided by the magno-valve. Shrinking the casing portion will cause it to move radially inwardly and thus reduce the tip clearance, e.g. when the gas turbine engine is in a normal mode of operation. Conversely, by removing the flow of cooler air over the casing portion, the casing portion may expand and the casing portion may move radially outwardly, eg when the gas turbine engine is operating at a higher than normal capacity. Accordingly, such an arrangement may provide another way of controlling the gap between rotating components and casing.

In a further alternative embodiment (not shown), the tip clearance control system may not rely on a fluid to radially move the casing portion. For example, the casing portion may be coupled to a ferromagnetic element, which loses its magnetic properties at a threshold temperature. When the ferromagnetic element loses its magnetic properties, the ferromagnetic member or any other member within a magnetic circuit may move from a first position to a second position and in doing so may move the casing portion in a radial direction. Accordingly, the ferromagnetic element may be mechanically and/or magnetically coupled to the casing portion to control the radial position of the casing portion. By way of example, the casing portion may be a component within a magnetic circuit, the magnetic circuit comprising the ferromagnetic element. The casing portion may comprise the ferromagnetic element. Alternatively, the casing portion may be mechanically coupled to a component within the magnetic circuit comprising the ferromagnetic element. In either case, the casing portion may be arranged such that when the magnetic flux in the magnetic circuit breaks down due to the temperature of the ferromagnetic element exceeding the Curie point, the casing portion may move from a first radial position to a second radial position.

The present disclosure describes a self regulating passive system which is able to adjust the gap between an aerofoil blade and a casing portion depending on the temperature of a fluid or component. The system may comprise a ferromagnetic element, which at a threshold temperature loses its magnetic properties and is coupled to the casing portion to control the radial position of the casing portion. The system may comprise a magno-valve adapted to selectively provide fluid to a casing portion. The magno-valve may also selectively provide cooling air to components within the gas turbine engine. Accordingly, a single temperature actuated device may both reduce the amount of cooling air and reduce the air gap between turbine blades and casing.

By reducing tip clearances, the above-described system may provide a simple and effective way of improving engine efficiency and hence reducing fuel consumption and emissions. Moreover, by only providing cooling air to particular components when it is required, the efficiency and fuel consumption may be further improved.

The lack of electronic or hydraulic control systems also presents a reduction in the size, weight and complexity. In addition, the absence of any electrical, pneumatic or hydraulic elements to the design means that the present disclosure may readily be used in high-temperature environments that components such as solenoid valves would not be able to withstand.

The invention claimed is:

1. A pressure activated tip clearance control device adapted to control the clearance of a rotating aerofoil structure with a surrounding casing portion, the device comprising:
a member operatively connected to the casing portion and responsive to pressurized fluid for moving the casing portion, the member having at least a first configuration in which the casing portion is at a first radial position and a second configuration in which the casing portion is at a second radial position;
an aerofoil structure tip clearance control system adapted to control a radial position of the casing portion by moving the casing portion from the first radial position to the second radial position upon expansion of an expandable chamber;
a conduit coupled to a fluid supply for pressurized fluid, the conduit being arranged to selectively provide pressurized fluid to the aerofoil structure tip clearance control system to move the casing portion between the first and second radial positions by selectively providing pressurized fluid from the fluid supply to expand the expandable chamber; and
a sensor passage in communication with the expandable chamber, the sensor passage arranged to sense radial growth of the rotating aerofoil structure and to relieve pressure in the expandable chamber to move the casing portion from the second radial position to the first radial position, wherein
configuration of the member is controlled by magnetic flux in a magnetic circuit which includes at least one ferromagnetic element comprising ferromagnetic material, whereby the configuration of the member is responsive to the temperature of the ferromagnetic element, and
the magnetic circuit is disposed to restrict flow through the conduit in the first configuration and permit flow through the conduit in the second configuration.

2. The device as claimed in claim 1, wherein the device is further configured to selectively cool a component.

3. The device as claimed in claim 2, wherein the device is configured to permit flow from the fluid supply to the component when the member is in the first configuration such that the component is cooled by the fluid.

4. The device as claimed in claim 1, wherein the ferromagnetic element is thermally coupled to the fluid.

5. The device as claimed in claim 1, wherein the ferromagnetic element is thermally coupled to the casing portion.

6. The device as claimed in claim 1, wherein the ferromagnetic element is thermally coupled to the aerofoil structure.

7. The device as claimed in claim 1, wherein a control orifice is provided in the conduit coupled to the fluid supply.

8. The device as claimed in claim 1, wherein the rotating aerofoil structure comprises a disc and a plurality of rotor blades, the rotor blades having platforms and the sensor passage is arranged to sense radial growth of the platforms of the rotor blades.

9. A gas turbine engine comprising the device as claimed in claim 1.

10. The gas turbine engine as claimed in claim 9, wherein the member is located in a non-rotating part of the gas turbine engine and the magnetic circuit includes at least a part located in a rotating part of the gas turbine engine.

11. A tip clearance control device adapted to control the clearance of a rotating aerofoil structure with a surrounding casing portion, the device comprising:
a member operatively connected to the casing portion; the member having at least a first configuration in which the casing portion is at a first radial position and a second configuration in which the casing portion is at a second radial position,
wherein the configuration of the member is controlled by magnetic flux in a magnetic circuit which includes at least one ferromagnetic element comprising ferromagnetic material, whereby the configuration of the member is responsive to the temperature of the ferromagnetic element;
an aerofoil structure tip clearance control system as said member adapted to control the radial position of the casing portion; and
a conduit coupled to a fluid supply, the conduit being arranged to selectively provide fluid to the aerofoil structure tip clearance control system to move the casing portion between the first and second radial positions;
wherein the magnetic circuit is disposed to restrict flow through the conduit in the first configuration and permit flow through the conduit in the second configuration;
wherein the aerofoil structure tip clearance control system comprises an expandable chamber configured to move the casing portion from the first radial position to the second radial position upon expansion of the chamber, wherein the conduit is arranged to selectively provide fluid from the fluid supply to expand the expandable chamber;

a sensor passage in communication with the expandable chamber, the sensor passage is arranged to sense radial growth of the rotating aerofoil structure and to relieve pressure in the expandable chamber to move the casing portion from the second radial position to the first radial position;

wherein the rotating aerofoil structure comprises a disc and a plurality of rotor blades, the rotor blades having platforms and the sensor passage is arranged to sense radial growth of the platforms of the rotor blades;

wherein the device further comprises a stationary structure, the sensor passage passes through the stationary structure, that platforms of the rotor blades have radially inner surfaces and the sensor passage is spaced from the radially inner surfaces of the platforms of the rotor blades.

12. A method of controlling the tip clearance of a rotating aerofoil structure with a surrounding casing portion; the method comprising:

providing a member operatively connected to the casing portion and responsive to pressurized fluid for moving the casing portion, the member having at least a first configuration in which the casing portion is at a first radial position and a second configuration in which the casing portion is at a second radial position;

providing an aerofoil structure tip clearance control system adapted to control a radial position of the casing portion by moving the casing portion from the first radial position to the second radial position upon expansion of an expandable chamber;

providing a conduit coupled to a fluid supply for pressurized fluid, the conduit being arranged to selectively provide pressurized fluid to the aerofoil structure tip clearance control system to move the casing portion between the first and second radial positions by selectively providing pressurized fluid from the fluid supply to expand the expandable chamber; and providing a sensor passage in communication with the expandable chamber, the sensor passage arranged to sense radial growth of the rotating aerofoil structure and to relieve pressure in the expandable chamber to move the casing portion from the second radial position to the first radial position, wherein configuration of the member is controlled by magnetic flux in a magnetic circuit which includes at least one ferromagnetic element comprising ferromagnetic material, whereby the configuration of the member is responsive to the temperature of the ferromagnetic element, and the magnetic circuit is disposed to restrict flow through the conduit in the first configuration and permit flow through the conduit in the second configuration;

moving the member under the application of pressurized fluid from the first configuration in which the casing portion is at the first radial position to the second configuration in which the casing portion is at the second radial position; and controlling the configuration of the member through the application of pressurized fluid to the member by the magnetic flux in the magnetic circuit, whereby the configuration is responsive to a temperature of the ferromagnetic element.

13. The method of claim 12, wherein the method further comprises:

selectively providing pressurized fluid to the aerofoil structure tip clearance control system from the fluid supply through the conduit coupled to the fluid supply to move the casing portion between the first and second radial positions;

restricting flow through the conduit when the member is in the first configuration; and permitting flow through the conduit when the member is in the second configuration.

14. The method of claim 12, including thermally communicating the ferromagnetic element with the rotating aerofoil structure and/or the casing portion.

* * * * *